Sept. 16, 1941.   R. B. RICKMAN   2,255,812
MATERIAL TRIMMING AND CUTTING DEVICE
Filed Nov. 14, 1940

INVENTOR
*Ruth B. Rickman.*
BY
ATTORNEY

Patented Sept. 16, 1941

2,255,812

UNITED STATES PATENT OFFICE 2,255,812

MATERIAL TRIMMING AND CUTTING DEVICE

Ruth B. Rickman, Arlington County, Va.

Application November 14, 1940, Serial No. 365,685

3 Claims. (Cl. 164—44)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the Act of April 30, 1928 (Ch. 460, 45 Stat. L. 467).

My invention relates to material trimming and cutting devices and more particularly to the provision of means for cutting reentrant angles in the material whereby the material is provided with offset edges.

Another of the important features of my invention lies in the arrangement of the offset so that rectangular sections may be cut therefrom with one sweep of the cutting edge for use, as an example, as index cards, and repeated sweeps of the cutting edge stacking the cards in a uniform arrangement.

One important feature of my invention is the arrangement of the offset so that multiple sheets of material may be arranged and cut simultaneously to provide visual index tabs. To facilitate such procedure I arrange the shearing members to produce a uniform shearing action throughout the sweep of the shearing edges.

Figure 1:
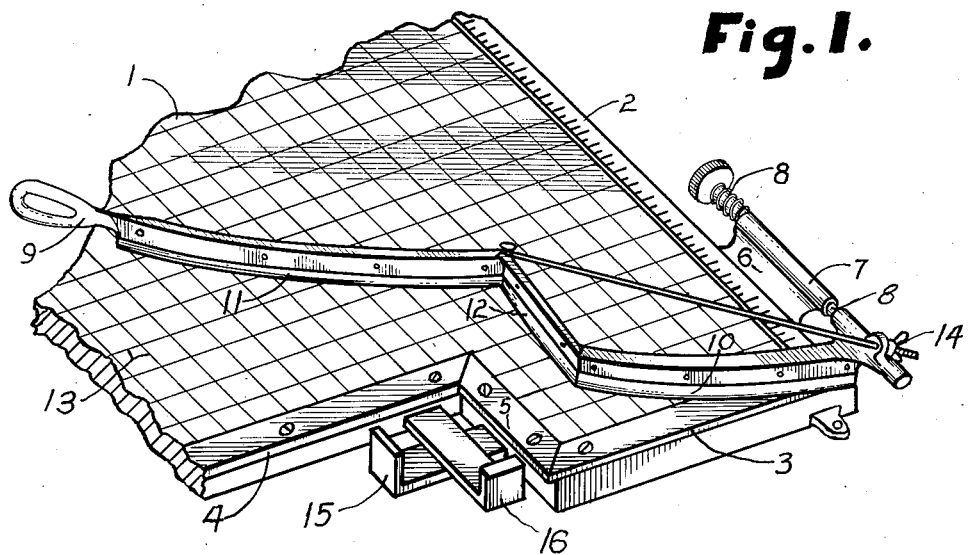
Figure 2:
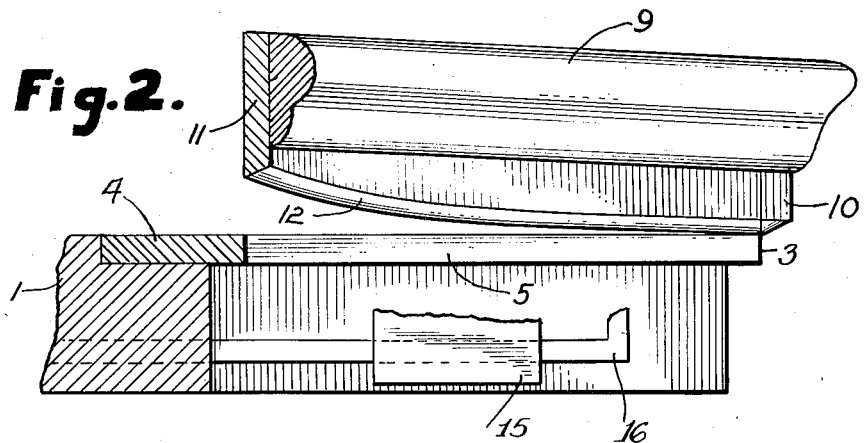

Other objects of my invention will become apparent as the description thereof is developed with reference to the accompanying drawing illustrative of one of the preferred embodiments thereof, and in which:

Fig. 1 is a perspective view of one of several types of material trimming devices selected as best illustrating the several features of my invention; and Fig. 2 is a detail elevational view of that device illustrating the manner in which the uniform shearing action of the main blades is introduced into the offset blade.

My invention includes a plane base 1, one edge of which is provided with a calibrated guide or gauge 2 at substantial right angles to which are offset overhanging metallic shearing edges 3 and 4 interconnected by an overhanging shearing edge 5 substantially at right angles thereto. For the sake of simplicity the shearing edges 3 and 4 will be referred to as the main shearing edges and the shearing edge 5 will be referred to as the offset shearing edge.

Upon one side of the base 1 is mounted a bracket 6 forming a bearing 7 for a shaft 8 rotatable therein and carrying the knife 9. This knife of substantially the same configuration as the offset edge of the base 1 carries removable main cutting edges 10 and 11 between which is a removable cutting edge 12.

The cutting edges 10, 11 and 12 of the knife 9 are set at a slight angle to the shearing edges 3, 4 and 5 (the angularity of the offset cutting edge 12 being adjustable by means of the tension member 14) and the shaft 8 is provided with an adjustable resilient member illustrated as a spring and thumb screw.

The cutting edges are ground along parabolic curves so that as the cutting edges 10, 11 and 12 are swept downwardly the shearing point of engagement of the cutting edge with shearing edge progressively moves along the knife, the direction of shear always remaining substantially perpendicular to the base 1. This feature is of particular importance in the cutting of index tabs to prevent skewing of the paper.

If it is desired to provide the top of legal cap paper, for example, with index tabs, the method to accomplish this is as follows:

The sheets to be cut are spaced with their edges parallel to the gauge 2 and in overlapping relation along the main shearing edge 4, the base 1 being provided with guides or gauges in the form of lines 13 to facilitate the proper overlap and alignment of the sheets, the height of the index tab being determined by the calibrated guide or gauge 16. As the knife 9 is swept downwardly the offset cutting edge 12 first cuts into the sheets to the depth determined by the gauge 16 and then the main cutting edge 11 passes progressively outward through the edges of the sheets.

If it is desired to provide the sides of the paper with index tabs the sheets are arranged parallel to the calibrated gauge 2 and in overlapping relation along the offset shearing edge 5, the gauges 13 again facilitating the proper overlap and alignment of the sheets, the width of the index tabs being determined by the calibrated gauge or guide 15. As the knife 9 is now swept downwardly the offset cutting edge 12 first cuts progressively into the overlapped sheets along a line located parallel inwardly from the edges thereof by an amount determined by the gauge 15 and then the main cutting edge 11 passes outwardly to the edge of the paper.

If it is desired to simultaneously trim the paper to the proper size and cut the paper with visual borders either method is utilized with the paper overlapping both the main shearing edges 3 and 4 and the offset shearing edge 12.

If it is desired to cut cards from the paper the gauges 15 and 16 are set to the dimension of the card and as the cards are cut they are neatly stacked and retained by the gauges 15 and 16.

It is apparent that either of the main cutting edges of the knife 9 may be used for trimming material in the usual manner.

While I have selected and described one embodiment of my invention as illustrating the objects and purposes thereof it is to be understood that various modifications may be made within the scope of the claims appended thereto without departing from the spirit thereof.

Having thus described my invention what I claim is:

1. In a material trimming device the combination of a base having a shearing edge, one portion of which is offset with respect to another and connected by another portion at substantially right angles thereto, and a knife, pivoted to said base, having offset portions and an intermediate portion in angular conformity with said shearing edge, the cutting edge of said knife throughout its portions including the intermediate portion being ground along a single curve progressively inclining beyond each successive point of shearing as the knife passes the shearing edge during a downward stroke about its pivot.

2. In a material trimming device the combination of a base having a shearing edge one portion of which is at substantially right angles to the remainder thereof, a knife, pivoted to said base, having substantially the same configuration in plan as that of said shearing edge, the cutting edge of said knife being ground along a curve extending throughout its length, and gauges for portions of material to be severed by said device located outwardly from the shearing edge and serving additionally as means for retaining and stacking the severed portions of the material.

3. In a material trimming device the combination of a base having a shearing edge one portion of which is at substantially right angles to the remainder thereof, a knife pivoted to said base, having substantially the same configuration in plan as that of said shearing edge, and fixed and movable gauges carried by said base, said movable gauges being adjustable substantially parallel to the portions of the shearing edge whereby material placed upon said base in alignment with said fixed and movable gauges may be cut in rectangular sections of predetermined size by one sweep of said knife.

RUTH B. RICKMAN.